United States Patent [19]

Findling

[11] Patent Number: 4,630,776

[45] Date of Patent: Dec. 23, 1986

[54] LIQUID DISPERSAL DEVICE

[75] Inventor: Josef Findling, Ettlingen, Fed. Rep. of Germany

[73] Assignee: GEA Wiegand GmbH, Fed. Rep. of Germany

[21] Appl. No.: 757,311

[22] Filed: Jul. 22, 1985

[30] Foreign Application Priority Data

Jul. 24, 1984 [DE] Fed. Rep. of Germany ....... 3427298

[51] Int. Cl.⁴ ............................................. B05B 1/26
[52] U.S. Cl. ................................. 239/553.3; 239/498; 239/500; 239/504
[58] Field of Search ........................... 239/498–500, 239/504, 518, 519, 524, 590.3, 590.5

[56] References Cited

U.S. PATENT DOCUMENTS

| 2,068,094 | 1/1937 | Webre | 239/500 |
| 2,713,895 | 7/1955 | Eckstrom | 239/504 X |
| 3,703,993 | 11/1972 | Schreiner | 239/498 X |

FOREIGN PATENT DOCUMENTS 314338 6/1956 Switzerland .
103488 1/1917 United Kingdom ................ 239/504
593744 2/1978 U.S.S.R. ............................. 239/498

Primary Examiner—Andres Kashnikow
Attorney, Agent, or Firm—Wood, Dalton, Phillips, Mason & Rowe

[57] ABSTRACT

A manifold device for the dispersal of a liquid from one end of a supply line. The device includes a series of deflector walls spaced progressively from the end of the supply line. Each deflector wall has a hole in line with the end of the supply line. The holes of the respective deflector walls are of decreasing cross-sections in a direction away from the supply line for passing progressively decreasing portions of the liquid therethrough. The remainder of the liquid is deflected by the deflector walls seriatum radially outwardly of the axis of the supply line. At least one of the deflector walls includes a collar thereabout and spaced radially outwardly from the axis of the supply line for diverting the liquid from the respective deflector wall. Teeth are formed integrally with and alternately bent radially inwardly and outwardly from the lower edge of the collar to disperse the liquid over the bottom of the manifold device.

8 Claims, 5 Drawing Figures

LIQUID DISPERSAL DEVICE

BACKGROUND OF THE INVENTION

This invention relates to a liquid dispersal device and, more particularly, to a manifold device for the dispersal of a liquid from one end of a supply line.

Manifold devices are known for receiving liquid from a single inlet or supply line and dispersing that liquid over a much larger area. For instance, such a device is shown in Swiss Pat. No. 314 448, dated July 31, 1956, wherein a tapered deflector is employed and toward which the outlet of a supply line is eccentrically directed. The tapered deflector diverts the liquid outwardly toward a plurality of slots in a peripheral chamber which surrounds the open manifold area about the supply line. However, such devices are prone to blockage which results in a variety of problems.

Specifically, it would be desirable to provide a liquid dispersal manifold device for dispersing liquids having a high concentration of solids, as well as liquids which tend to form deposits, both of which are prone to cause blockage in the device. It also would be desirable to provide a device which is substantially independent of the power of the liquid flow. Such a device should be extremely simple yet very effective for breaking up the flow of liquid from the supply line and to disperse the liquid evenly over the bottom of the manifold.

This invention is directed to solving the problems and satisfying the needs described above.

SUMMARY OF THE INVENTION

An object of the invention, therefore, is to provide a new and improved manifold device for the dispersal of liquid from one end of a supply line.

Another object of the invention is to provide a dispersal device of the character described which is simple in construction yet very effective in dispersing highly contaminated liquids.

In the exemplary embodiment of the invention, the manifold device include wall means spaced from the end of the supply line for deflecting at least a portion of the liquid radially outwardly of the axis of the supply line. Collar means are provided around the wall means spaced outwardly from the axis for diverting the liquid from the wall means. Tab means are provided along a lower edge of the collar means, spaced from the wall means, for directing the diverted liquid radially inwardly and outwardly toward the bottom of the manifold device.

The tab means are defined by teeth formed integrally with and alternately bent radially inwardly and outwardly from the edge of the collar means. The pitch angle of the teeth which are bent radially inwardly preferably exceeds the pitch angle of the teeth which are bent radially outwardly. It has proven quite effective that the pitch angle of the inwardly bent teeth is on the order of 90°±10° and the pitch angle of the outwardly bent teeth is on the order of 40°±10°.

The wall means includes a hole in line with the end of the supply line, the hole being of a smaller cross-section than the end of the supply line for passing a portion of the liquid therethrough. The device may include further wall means spaced from the first wall means on the side thereof opposite the supply line for directing at least a portion of the liquid passing through the hole in the first wall means radially outwardly. In other words, a series of deflector walls may be provided, spaced progressively from the end of the supply line, with each deflector wall having a hole in line with the end of the supply line. The holes in the respective deflector walls are of decreasing cross-sections in a direction away from the supply line for passing progressively decreasing portions of the liquid therethrough. The remainder of the liquid is deflected by the deflector walls radially outwardly of the axis of the supply line. One or more of the deflector walls include the aforesaid collar means thereabout, with the tab means or teeth formed about an edge of the collar means. A solid wall is provided at an end of the manifold device opposite the supply line. The supply line may be directed into either the bottom or the top of the manifold device.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
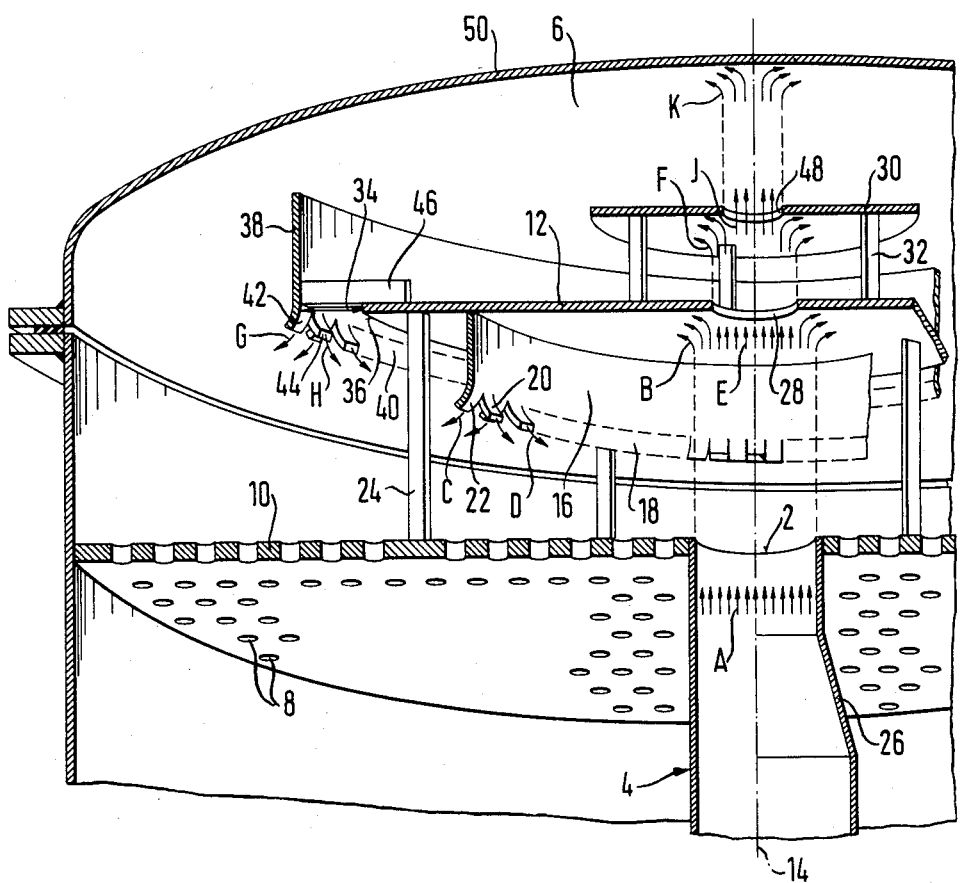
FIG. 1 is a fragmented vertical section, partially in perspective, of one embodiment of the liquid dispersal device of the invention.

Referring to the drawings in greater detail, FIG. 1 shows a device for dispersing a liquid introduced into a manifold 6 from the top open end 2 of a supply line 4 through a bottom wall 10 of the manifold which is provided with openings 8. The bottom wall surrounds supply line 4 and closes off the lower part of the manifold.

A first deflector wall 12 is disposed horizontally within manifold 6 spaced above the upper end of supply line 4. A collar 16 is located below deflector wall 12 around axis 14 of supply line 4. A lower peripheral edge portion 18 of collar 16 is divided into a plurality of tabs or teeth 20 and 22 which are formed integrally with and alternately bent radially inwardly and outwardly from the lower edge of collar 16. Deflector wall 12 is supported on bottom wall 10 of the manifold by support posts 24.

In the embodiment of the invention illustrated in FIG. 1, the diameter of supply line 4 to the left of axis 14 is shown constant over its entire length, whereas the supply line is shown to the right of axis 14 with a tapered section 26 immediately below the upper end 2 of the supply line, whereby the tapered section narrows as it approaches the end of the line.

A hole 28 is formed in deflector wall 12 in line with the end of supply line 4. The hole is of a smaller cross-section than open end 2 of the supply line. A second deflector wall 30 is supported by posts 32 above first deflector wall 12. The second deflector wall 30 has a hole 48 in line with supply line 4 and hole 28 in first deflector wall 12. Hole 48 is of a smaller cross-section than hole 28.

The upper side of first deflector wall 12 is encompassed by a second collar 38 at a distance from its perimeter. The lower edge of collar 38 is formed with two tabs 42 and 44 which are alternately bent radially outwardly and radially inwardly, respectively. Second collar 38 is secured by means of horizontal support braces 46 to the upper side of first deflector wall 12 whereby supports 46 project beyond the periphery 36 of wall 12.

In operation of the device shown in FIG. 1, liquid flows from the open upper end 2 of supply line 4 into manifold 6 in the direction of arrows "A". Part of the liquid will impinge upon the lower side of first deflector wall 12 about hole 28 and be diverted radially outwardly in the direction of arrows "B". A portion of the liquid will immediately drip down onto bottom wall 10. The remainder of the diverted liquid will be directed outwardly against collar 16. This liquid will flow down the collar and be dispersed radially outwardly and radially inwardly by teeth 20 and 22, respectively, in the direction of arrows "C" and "D", and then downwardly onto bottom wall 10 and through openings 8.

Liquid that is not diverted in the direction of arrows "B" along the bottom of deflector wall 12 will pass through hole 28 in the direction of arrows "E". Part of this liquid will be diverted by second deflector wall 30 in the the direction of arrows "F", and impinge upon second collar 38. This liquid will flow downwardly along the collar and be dispersed by teeth 42 and 44 in the direction of arrows "G" and "H", and downwardly onto bottom wall 10 and through openings 8. The remainder of the liquid will pass through hole 48 and deflector wall 30 in the direction of arrows "I" to impinge against a solid top wall 50 of manifold 6, where it will be diverted radially outwardly in the direction of arrows "K". With the structure shown in FIG. 1, the liquid from supply line 4 will be scattered or dispersed over openings 8 and bottom wall 10 in a generally uniform manner. The size of the openings can be constructed in accordance with the type of liquid being dispersed.

Figure 2:
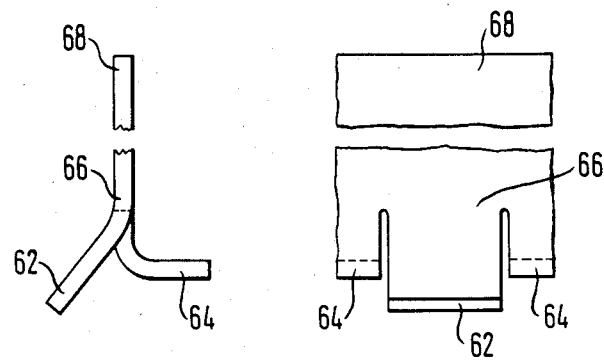
FIG. 2 is a composite view illustrating, on the left, a fragmented end elevation of a dispersal tooth and on the right, a fragmented side elevation of the tooth.

FIG. 2 shows a preferred construction of the dispersing teeth 20, 22, 42, and 44. Specifically, a tooth 62 (FIG. 2) is bent radially outwardly at an angle on the order of 40°. A tooth 64 is bent radially inwardly at a pitch angle on the order of 90°. These teeth are formed integrally with the lower peripheral edge 66 of a collar 68 and obviously can be simply made from sheet metal or the like. For uniformity purposes, collar 68 corresponds to collars 16 and 38 in FIG. 1, teeth 62 correspond to teeth 22 and 42 in FIG. 1, and teeth 64 correspond to teeth 20 and 44 in FIG. 1.

Figure 3:
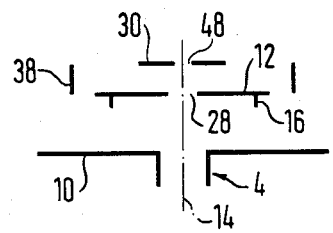
FIG. 3 shows a schematic view of the general arrangement of a two-stage design according to FIG. 1.

FIG. 3 shows a schematic arrangement of a two-stage version of the invention according to FIG. 1 and in which the same reference numerals are employed.

Figure 4:
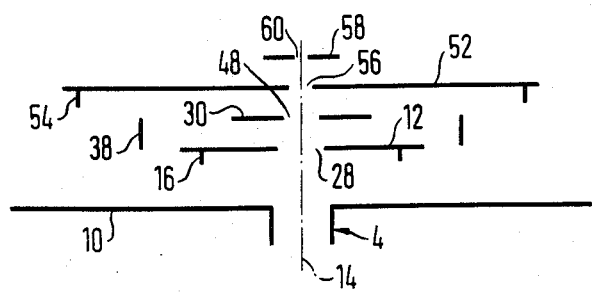
FIG. 4 shows a schematic view of the general arrangement of a three-stage version of the device.

FIG. 4 shows a schematic arrangement of a three-stage embodiment. In addition to the arrangements shown in FIGS. 1 and 3, the embodiment of FIG. 4 shows a third deflector wall 52 having a greater diameter than that of deflector wall 12, and a collar 54 is located on the underside of deflector wall 52 radially beyond collar 38. A hole 56 is provided in deflector wall 52 coaxial with hole 48 in deflector wall 30 but of a smaller cross-section. Still a further deflector wall 58 is provided above deflector wall 52, with a hole 60 of a still progressively smaller cross-section. Thus, it can be seen that a series of deflector walls are spaced progressively from the end of the supply line, with each deflector wall having a hole in line with the end of the supply line, and with the holes of the respective deflector walls being of decreasing cross-sections in a direction away from the supply line for passing progressively decreasing portions of the liquid therethrough. The remainder of the liquid is deflected seriatum by the deflector walls radially outwardly of the axis 14 of the supply line.

Figure 5:
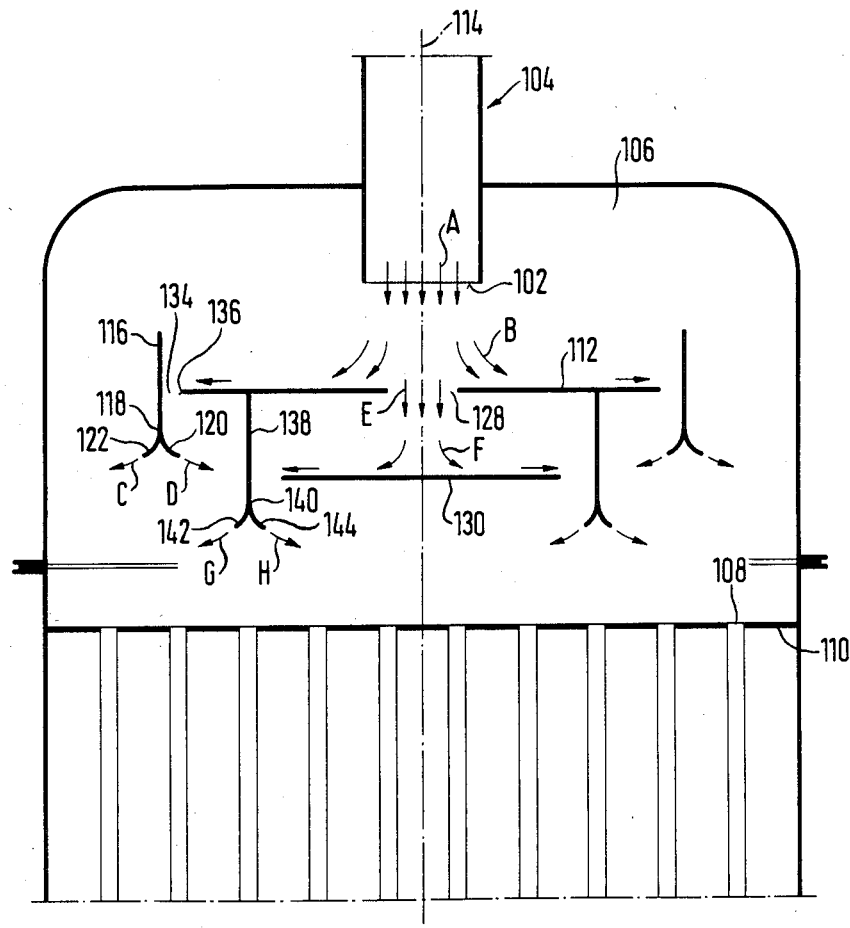
FIG. 5 shows a schematic view of an embodiment of the invention, with the supply line introduced into the top of the device.

FIG. 5 shows a schematic arrangement of the device corresponding to FIG. 1, with the exception that a supply line 104 is introduced into manifold 106 from the top thereof. For correlation purposes, components of the device in FIG. 5 have been given reference numerals the same as FIG. 1, preceded by "100". Therefore, no further description need be made of the operation of the device in FIG. 5.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A manifold device for the dispersal of a liquid from an end of a supply line, comprising:
    a dispersal chamber defined by a top wall and a bottom wall, the supply line penetrating the bottom wall from below, and the bottom wall being provided with a plurality of openings;
    a deflector plate located in the dispersal chamber spaced above the end of the supply line for deflecting the liquid impinging thereupon from below from the end of the supply line toward an edge of the deflector plate;
    a collar attached to the underside of the deflector plate and encompassing the axis of the supply line; and
    tab means along a lower edge of the collar and radially bent alternately inwardly and outwardly from the edge of the collar.

2. The device of claim 1 wherein a hole is formed in said deflector plate opposite the end of said supply line, the cross-section of said hole being smaller than that of said supply line, a second deflector plate is provided in spaced relationship to the side of the first deflector plate which is remote from said supply line, the diameter of said second deflector plate being smaller than the diameter of said first deflector plate, said second deflector plate deflecting the liquid impinging thereupon through said hole to a second collar encompassing the axis of said supply line and arranged at a radial distance from the periphery of said first deflector plate, the lower edge of said collar being formed with alternately bent tab means.

3. The device of claim 2 wherein a hole is formed in said second deflector plate opposite the hole in said first deflector plate, the cross-section of the hole in the second deflector plate being smaller than that of the hole in said first deflector plate.

4. The device of any one of the claims 1-3 wherein the pitch angle of the radially inwardly bent tabs means exceeds the pitch angle of the radially outwardly bent tabs means.

5. The device of claim 4 wherein the larger pitch angle is on the order of 80° to 100°, preferably about 90°, and the smaller pitch angle is on the order of 30° to 50°, preferably about 40°.

6. A manifold device for the dispersal of a liquid from an end of a supply line, comprising:
   a dispersal chamber defined by a top wall and a bottom wall, the supply line penetrating the top wall from above, and the bottom wall being provided with a plurality of openings;
   a first deflector plate located in the dispersal chamber spaced below the end of the supply line for deflecting the liquid impinging thereupon from above the end of the supply line toward an edge of the first deflector plate, the first deflector plate being provided with a hole opposite the end of the supply line and of a cross-section smaller than the supply line;
   a first collar encompassing the axis of the supply line and spaced a radial distance from the periphery of the first deflector plate;
   tab means along a lower edge of the first collar and radially bent alternately inwardly and outwardly from the edge of the first collar;
   a second deflector plate in spaced relationship to the side of the first deflector plate which is remote from the supply line for deflecting the liquid impinging thereupon through the hole in the first deflector plate, the second deflector plate being smaller than the diameter of the first deflector plate;
   a second collar encompassing the axis of the supply line and spaced a radial distance from the periphery of the second deflector plate, the second collar being attached to the underside of the first deflector plate; and
   tab means along a lower edge of the second collar and radially bent alternately inwardly and outwardly from the edge of the second collar.

7. The device of claim 6 wherein the pitch angle of the radially inwardly bent tab means are larger than the pitch angle of said radially outwardly bent tab means.

8. The device of claim 7 wherein the larger pitch angle is on the order of 80° to 100°, preferably about 90°, and the smaller pitch angle is on the order of 30° to 50°, preferably about 40°.

* * * * *